United States Patent
Sackler

(10) Patent No.: US 9,643,202 B2
(45) Date of Patent: May 9, 2017

(54) PERFORATED PAINTER'S MASKING TAPE

(71) Applicant: Kathe Sackler, Stamford, CT (US)

(72) Inventor: Kathe Sackler, Stamford, CT (US)

(\*) Notice: Subject to any disclaimer, the term of this patent is extended or adjusted under 35 U.S.C. 154(b) by 0 days.

(21) Appl. No.: 14/440,702

(22) PCT Filed: Nov. 5, 2013

(86) PCT No.: PCT/US2013/068470
§ 371 (c)(1),
(2) Date: May 5, 2015

(87) PCT Pub. No.: WO2014/071362
PCT Pub. Date: May 8, 2014

(65) Prior Publication Data
US 2015/0298155 A1    Oct. 22, 2015

Related U.S. Application Data

(60) Provisional application No. 61/722,751, filed on Nov. 5, 2012.

(51) Int. Cl.
*B05B 15/04* (2006.01)
*C09J 7/02* (2006.01)
*C09J 7/00* (2006.01)

(52) U.S. Cl.
CPC ............ *B05B 15/0456* (2013.01); *C09J 7/00* (2013.01); *C09J 7/0296* (2013.01);
(Continued)

(58) Field of Classification Search
CPC ............ Y10T 428/15; B05B 15/0456; B05B 15/0481
See application file for complete search history.

(56) References Cited

U.S. PATENT DOCUMENTS

| 4,562,102 A | 12/1985 | Rabuse et al. |
| 5,712,012 A | 1/1998 | Forman et al. |

(Continued)

FOREIGN PATENT DOCUMENTS

| WO | 92/03250 A2 | 3/1992 |
| WO | 95/06450 A1 | 3/1995 |

(Continued)

OTHER PUBLICATIONS

International Search Report issued Mar. 18, 2014 during prosecution of International Patent Application No. PCT/2013/068470.
(Continued)

*Primary Examiner* — Alexander Thomas
(74) *Attorney, Agent, or Firm* — Troutman Sanders LLP

(57) ABSTRACT

This invention generally relates to a painter's masking tape that covers well and is easy to tear in a straight edge without the use of scissors or other mechanical means. The tape comprises perforated portions that allow for the easy tearing of the tape. The bottom surface of the tape has an adhesive layer that is easily removed from the surface of the object to be protected. The non-adhesive portion is coated with an impervious coating to prevent the seepage of the paint or other liquid through the tape and onto the protected surface. The perforated portions of the tape are also made impervious to liquids by either being covered with an impervious coating, film, or tape pieces.

18 Claims, 2 Drawing Sheets

(52) U.S. Cl.
CPC ........ *C09J 2201/16* (2013.01); *C09J 2201/20* (2013.01); *C09J 2201/28* (2013.01); *C09J 2201/606* (2013.01); *C09J 2203/31* (2013.01)

(56) References Cited

U.S. PATENT DOCUMENTS

| | | |
|---|---|---|
| 7,138,169 B2 | 11/2006 | Shiota et al. |
| 7,216,764 B2 | 5/2007 | Forman |
| 2010/0059162 A1 | 3/2010 | Flanigan |

FOREIGN PATENT DOCUMENTS

| | | |
|---|---|---|
| WO | 98/52856 A1 | 11/1998 |
| WO | 01/14489 A1 | 3/2001 |
| WO | 2008/015588 A2 | 2/2008 |
| WO | 2008/039308 A2 | 4/2008 |

OTHER PUBLICATIONS

European Extended Search Report dated Jun. 13, 2016, issued in corresponding European Application No. 13851386.6.

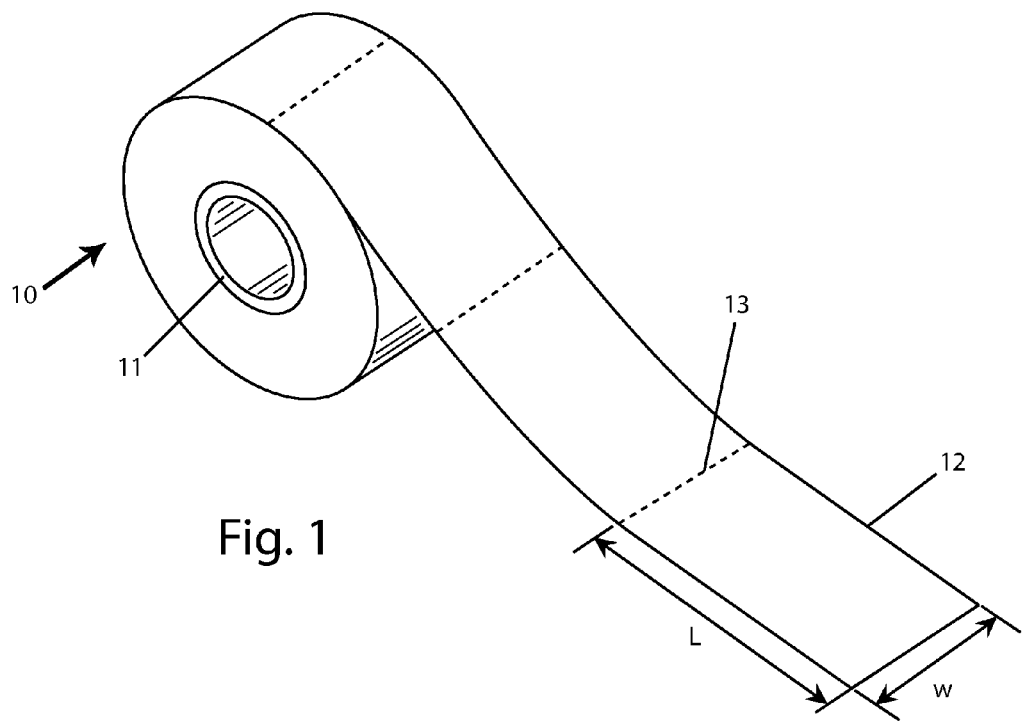
Fig. 1
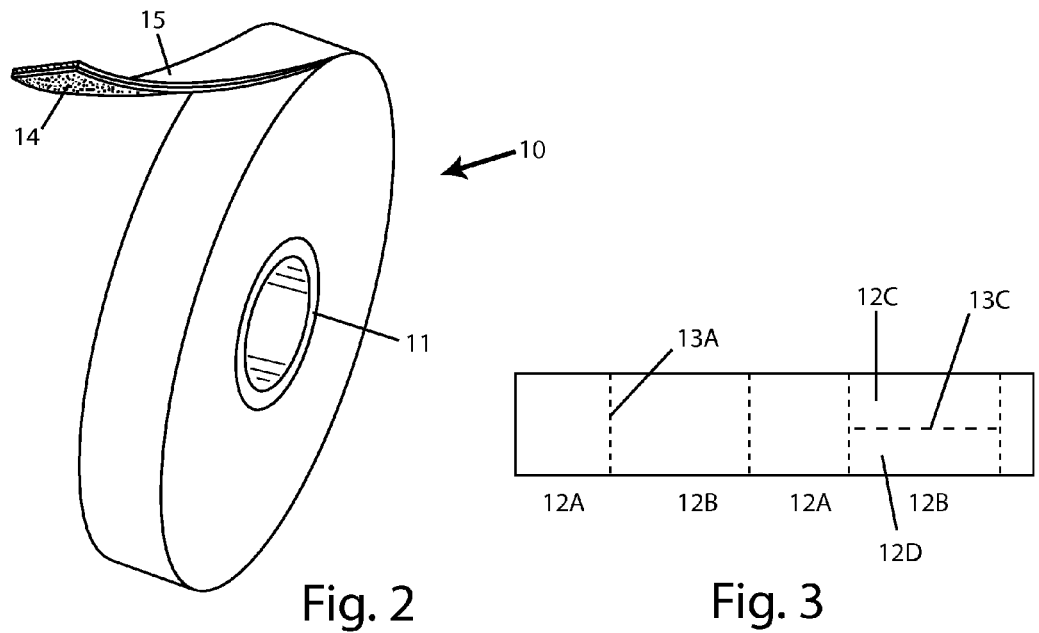
Fig. 2
Fig. 3

PERFORATED PAINTER'S MASKING TAPE

This application claims priority to International Application No. PCT/US2013/068470 filed Nov 5, 2013 and published as WO 2014/071362 on May 8, 2014. The International Application claims priority to U.S. Provisional Application No. 61/722,751, filed Nov 5, 2012, all of the applications above are incorporated herein by reference in their entirety.

FIELD OF THE INVENTION

The present invention relates to a removable masking tape with perforations, wherein the tape can be separated at any of the perforations and the perforations do not permit the paint to reach the masked surface.

BACKGROUND

The need to protect surfaces during painting and other finishing operations of bordering surfaces requires the shielding or masking of the surfaces to be protected. In order to protect the surfaces, the user tears off a portion of masking tape for use in covering the surface to be protected. This is a time consuming job which requires careful attention to detail if the surface is to be fully protected.

While masking tape covers well and is easy to tear, it is not easy to tear in a straight line. The jagged tape edge often leaves a portion of the surface exposed and likely to be damaged or soiled with paint or plaster or the jagged edge protrudes into the area to be painted resulting in the paint not properly coating the surface to be painted. None of the present methods are suitable for easily and satisfactorily obtaining a section of tape properly sized while maintaining adequate protection against the paint or other liquid. Scissors are impractical, hazardous, and inefficient to use on a job site. A saw toothed cutting edge, as is sometimes provided for transparent and packing tape, is also awkward and dangerous.

SUMMARY

The examples of the present invention provides a painter's masking tape that can be used with a wide variety of different surfaces. The tape is extremely easy to install and easy to remove without damage to, or sullying of, the items being masked. The tape can be easily torn by the user to the required length due to perforations in the tape. The tape is ideal to use during painting and other finishing operations of bordering surfaces because the tape is coated with an impervious coating to prevent the paint or other finishing products from penetrating the tape to reach the protected surface. The perforations are also impervious to liquids to prevent the paint or other finishing products from passing through the perforated portions to the protected surface.

BRIEF DESCRIPTION OF THE DRAWINGS

FIG. 1 is a perspective view of an example of the invention in a roll.

FIG. 2 is another perspective view of an example of the invention demonstrating the adhesive and non-adhesive sides.

FIG. 3 is a top view of an example of the invention demonstrating uneven tape sections 12A and 12B and perforations 13A.

DETAILED DESCRIPTION

Figure 4A:
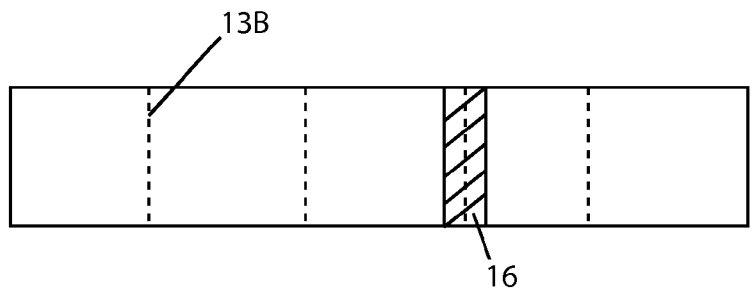
FIGS. 4A-C are top views of examples of the invention demonstrating perforated portions 13B and ways in which the perforations can be impermeable to liquids.
Figure 4B:
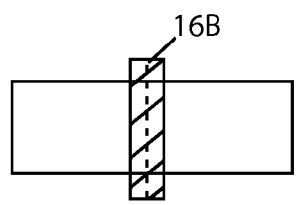
Figure 4C:
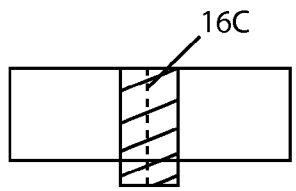

The examples of the present invention include a painter's masking tape. The painter's masking tape 10 may be wrapped around a core 11 to form a roll. In another example, the painter's masking tape is rolled upon itself rather than around a core. In yet another example the painter's masking tape is in sheets of a certain length.

The tape 10 of the present invention has a length 1 along the axis in which the tape unrolls and a width w which is perpendicular to the unrolling axis. The tape can then be used to cover the surface of an object to be protected from a liquid such as paint or other products being applied to an adjacent unprotected surface.

An example includes a series of equally spaced tape sections 12 that can be separated from the roll. In this example, the perforations 13 are equidistant from each other. The perforations 13 allow the painter's masking tape to be effortlessly torn by the user to yield a piece of tape of the desired length made up of one or multiple tape sections 12. The perforations 13 allow the painter's masking tape to be torn in straight edges to more effectively cover the surface to be protected. The straight edge achieved by the present invention prevents the tape from protruding onto the surface being coated with the liquid and allows the entire portion of the surfacing being protected to be appropriately covered.

In another example, the length 1 can then be divided into a series of unequally tape sections 12. In this example, the perforations 13 are not equidistant from each other. In a further example the sections alternate in length ratios of 1:2, 1:3, 1:4, or 1:5. For example, for a 1:2 ratio the painter's masking tape sections could alternate between a 0.5 inch length section and a 1 inch length section or alternate between a 1 centimeter section and a 2 centimeter section, as illustrated in FIG. 3. Unequal lengthed sections 12A and 12B allow the user to more accurately obtain the desired length to cover the surface to be protected.

In another example, the present invention comprises a series of unequally sections in a ratio of 1:2:4, 1:3:6, or 1:2:5.

In one example of the present invention, the width w of the tape is 0.5 inches, 0.75 inches, 1 inch, and 1.25 inches 1.5 inches, 1.75 inches, 2 inches, 2.25 inches, 2.5 inches, 2.75 inches, 3 inches, 3.25 inches, 3.5 inches, 3.75 inches, 4 inches, 4.25 inches, 4.5 inches, 4.75 inches, or 5 inches. In another example the painter's masking tape can be in a variety of widths from 0.5 inches up to 6 inches in ⅓ or ¼ intervals between.

In addition to length segments, the tape 10 can also have width segments 12C, 12D. As with the length segments 12A, 12B, the width segments 12C, 12D can be in equal segments or have varying ratios, as above. FIG. 3 illustrates both the width segments 12C, 12D and the width perforations 13C. FIG. 3 also illustrates that the tape 10 can be perforated in both the length l and width w directions, either alternately or in combination.

The painter's masking 10 includes an adhesive side 14 and a non-adhesive side 15. In one example, the perforations 13 are equally spaced and parallel with the width w of the tape extending entirely through the tape. In another example, the perforations are unevenly spaced 13A and 13B, as noted above.

In one example, the perforated portion 13A extends from both edges of the tape and consists of small closely spaced perforations connected by an elongated perforation in the center of the perforated portion 13A. In one example, the closely spaced perforations extend towards each other from each edge of the tape for ¼ of the width of the perforated portion 13A in each direction. In another example, the closely spaced perforations extend towards each other from each edge of the tape for ⅓ of the width of the perforated portion 13A in each direction. The perforations can be pin point holes, and can also extend the length l or width w of the tape 10.

In another example, the perforation portion 13B extends from both edges of the tape and consists of two elongated perforations with a set of closely spaced perforations connecting each elongated perforation. In one example, the elongated perforations extend towards each other from each edge of the tape for ¼ of the width of the perforated portion 13B in each direction. In another example, the elongated perforations extend towards each other from each edge of the tape for ⅓ of the width of the perforated portion 13B in each direction.

The painter's masking tape of the present example is coated with a low tack adhesive 14 on one side of the tape, the adhesive side 14A. An example of the painter's masking tape uses an acrylic adhesive that is UV resistant to prevent the curing of the adhesive to the surface to be protected; therefore, the painter's masking tape can be easily removed from the protected surface. The adhesive layer 14 may be comprised of, but not limited to, acrylic polymers, thermoplastic elastomers, polyurethanes, block copolymers, polyolefins, silicones, rubber based adhesives, a blend of an acrylic adhesive and rubber based adhesive, and combinations thereof. The adhesive layer 14 can be developed to be easily adhered and removable from most common surfaces. Some surfaces include wood, glass, sheetrock, plaster, plastic, metal, etc. The adhesive layer is easily removed and does not damage the surface or any superficial layer or coating the tape 10 covers.

In one example, the adhesive does not cover the perforated portions 13, 13A, 13B, or 13C of the tape 10. In this embodiment, there is a non adhesive zone 14B surrounding the perforated portions 13, 13A, 13B, or 13C of the tape 10. The non adhesive zone 14B extends equidistant from the perforations 13, 13A, 13B, or 13C of the tape 10 by ¼, ⅛, 1/16, 1/20, 1/24 or 1/32 of an inch.

A non-adhesive surface 15A of the painter's masking tape can be coated with a substance 15 that makes the tape impervious or at least resistant to the absorption of paint, shellac, stains, lacquers, varnish, spackle, glaze, cleaning fluids, stripping solutions, or other coating, sealing, or finishing products. The coating of the non-adhesive surface 15A also allows the adhesive surface 14A and adhesive layer 14 of the tape to be easily separated from the non-adhesive surface 15A of the painter's masking tape. The adhesive layer 14 cannot remove or react with the liquid resistant substance 15 once they are in contact and then separated, as when the tape 10 is unrolled. The liquid resistant substance 15 also does not react with the adhesive layer 14 if it seeps through the perforations.

In one example, the coating of the non-adhesive side 15A of the painter's masking tape is an absorbent layer. The absorbent layer prevents liquids applied to the masked area from passing through the tape to the object being protected. Such an absorbent layer can be made of solid, granular cross-linked polyacrylate polymers that rapidly absorb and retain solutions and liquids. The absorbent layer may be made of, but not limited to, sodium polyacrylate, cellulosic or starch-graft copolymers and synthetic super-absorbent materials made from polyacrylic acids, polymaleic anhydride-vinyl monomers, polyvinyl alcohols, and polyacrylonitrile.

Figure 5A:
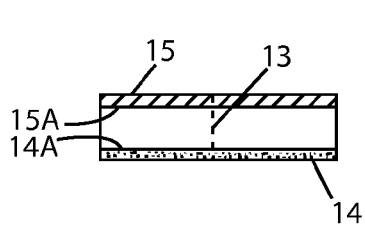
FIGS. 5A-C are side views of examples of the invention demonstrating ways in which the perforations can be impermeable to liquids.

In a further example, the liquid resistant or absorbent coating 15 of the non-adhesive side of the tape covers the perforations 13 but does not render the perforated portions difficult to tear, as illustrated in FIG. 5A. The coating 15 on the non-adhesive side 15A does not interfere with the adhesive layer 14 of the tape 10.

Further, the perforated portions 13 of the tape can be made non-permeable by the addition of liquid impermeable tape pieces 16 covering the perforated portions 13 of the tape 10. The liquid impermeable tape piece 16 can thus be mechanically removed from the tape 10 prior to the tearing of the tape 10 at the perorated portions 13 of the tape 10. The liquid impermeable tape pieces 16 covering the perforated portions 13 of the tape 10 can be the same or different material than the masking tape 10 of the present invention. The liquid impermeable tape 16 covering the perforated portions 13 can be a different color than the tape 10 to easily identify where the perforated portions 13 are located. In an example, the liquid impermeable tape 16 covering the perforated portions 13 can be colored in such a manner to help the user to gauge the length of the tape. For example, the space between two red colored impermeable tape pieces 16 covering the perforated portions 13 can be set to be a particular distance, such as one foot apart; while the color of the intervening impermeable tape pieces 16 are a different color. In some embodiments, the tape piece 16B and 16C extends past the width of the tape 10 for ease of removal from the tape. In these embodiments the tape piece may extend past the tape 10 in both directions 16B or only one direction 16C. The portion of the tape piece extending beyond the tape 10 does not have an adhesive portion.

Figure 5B:
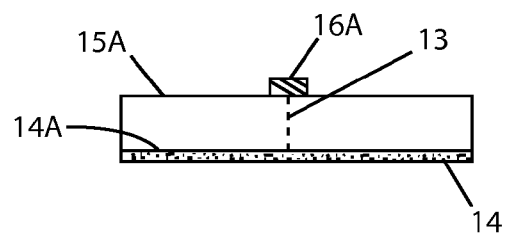
Figure 5C:
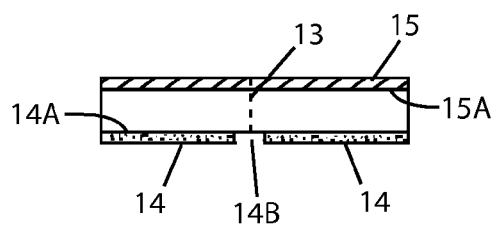

In a yet further example, the perforated portions 13A, 13B, 13C of the tape 10 are made non-permeable by the addition of a liquid impermeable film 16A that covers the perforated portions 13A, 13B, 13C of the tape 10, and in some examples, only the perforated portions 13A, 13B, 13C, as illustrated in FIG. 5B. The film 16A is easily separated by mechanical means such as physically tearing of the tape 10 thereby not interfering with the separation of the tape 10 at the perforated portions 13A, 13B, 13C. Such films 16A can be comprised of, but not limited to, thermoplastic hydrophilic polymer or a mixture of thermoplastic hydrophilic polymers selected from the group consisting of polyurethanes, poly-ether-amide block copolymers, polyester-amide block copolymers, polyethylene oxide and its copolymers, poly lactide and copolymers, (co)polyamides, (co)polyesters, polyester block copolymers, sulfonated polyesters, poly-ether-ester block copolymers, poly-ether-ester-amide block copolymers, polyacrylates, polyacrylic acids and derivatives, polyethylene-vinyl acetate with a vinyl acetate content of at least 28% by weight, polyvinyl alcohol and its copolymers, polyvinyl ethers and their copolymers, poly-2-ethyl-oxazoline and derivatives, polyvinyl pyrrolidone and its copolymers, thermoplastic cellulose derivatives, poly glycolide, polyureas, and mixtures thereof a functionalized copolymer or a blend of functionalized copolymers containing functional groups capable of interacting with the thermoplastic hydrophilic polymer or mixture of thermoplastic hydrophilic polymers, and a suitable compatible plasticiser, or a blend of suitable compatible plasticisers.

Moreover, while examples according to the present invention were explained in detail referencing the figures, the specific structures are not limited to the configurations in the forms of examples set forth above, but rather, of course, even design changes within a scope that does not deviate from the spirit or intent of the present invention are included in the present invention.

The invention claimed is:

1. A tape for masking a surface being protected from a liquid, having a length and a width, comprising:
　an adhesive side at least partially coated with an adhesive that is removably adhesive to the surface;
　a non-adhesive side, opposite the adhesive side, coated with a liquid impermeable coating; and
　perforations extending from the adhesive side to the non-adhesive side,
　wherein the perforations are impermeable to the liquid and can be torn in a preferential manner, and
　wherein the perforations are made impermeable to liquid by covering the perforations with liquid impermeable tape pieces.

2. The tape of claim 1, wherein the perforations are equidistant from each other.

3. The tape of claim 1, wherein the perforations are not equidistant from each other.

4. The tape of claim 3, wherein the perforations are separated from each other at a ratio of 1:2, 1:3, 1:4, or 1:5.

5. The tape of claim 1, wherein the liquid impermeable coating makes the perforations impermeable to liquid.

6. The tape of claim 1, wherein the perforations run parallel to the width.

7. The tape of claim 1, wherein the perforations run parallel to the length.

8. The tape of claim 1, wherein the liquid impermeable tape pieces extend past the width of the tape.

9. The tape of claim 8, wherein the liquid impermeable tape pieces extend past the width of the tape in both directions.

10. The tape of claim 8, wherein the liquid impermeable tape pieces extend past the width of the tape in one direction.

11. A tape for masking a surface being protected from a liquid, having a length and a width, comprising:
　an adhesive side at least partially coated with an adhesive that is removably adhesive to the surface;
　a non-adhesive side, opposite the adhesive side, coated with a liquid impermeable coating; and
　perforations extending from the adhesive side to the non-adhesive side,
　wherein the perforations are impermeable to the liquid and can be torn in a preferential manner, and
　wherein the perforations are made impermeable to liquid by the presence of a liquid impermeable film covering the perforations.

12. The tape of claim 11, wherein the perforations are equidistant from each other.

13. The tape of claim 11, wherein the perforations are not equidistant from each other.

14. The tape of claim 13, wherein the perforations are separated from each other at a ratio of 1:2, 1:3, 1:4, or 1:5.

15. The tape of claim 11, wherein the perforations are made impermeable to liquid by coating over the perforations with a liquid impermeable coating.

16. The tape of claim 11, wherein the perforations run parallel to the width.

17. The tape of claim 11, wherein the perforations run parallel to the length.

18. The tape of claim 11, wherein the liquid impermeable film covers only the perforated portions of the tape.

* * * * *